(12) United States Patent
Ogino et al.

(10) Patent No.: US 6,204,981 B1
(45) Date of Patent: *Mar. 20, 2001

(54) METHOD FOR SUPERIMPOSING AND DETECTING ADDITIONAL INFORMATION SIGNAL, METHOD FOR DETECTING ADDITIONAL INFORMATION SIGNAL, DEVICE FOR DETECTING ADDITIONAL INFORMATION SIGNAL, AND DEVICE FOR RECORDING INFORMATION SIGNAL

(75) Inventors: Akira Ogino, Chiba; Nozomu Ikeda, Tokyo, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,717

(22) Filed: Feb. 27, 1998

(30) Foreign Application Priority Data

Mar. 3, 1997 (JP) ...................................... 9-048047

(51) Int. Cl.⁷ .............................. G11B 15/04; G11B 5/02

(52) U.S. Cl. ............................................. 360/60; 360/27

(58) Field of Search .............................. 360/60; 375/208; 380/3, 4, 5

(56) References Cited

U.S. PATENT DOCUMENTS

| | | | |
|---|---|---|---|
| 5,073,925 | * 12/1991 | Nagata et al. | 360/60 |
| 5,243,423 | 9/1993 | Ogura et al. | 358/142 |
| 5,719,937 | * 2/1998 | Warren et al. | 380/4 |
| 5,960,398 | * 9/1999 | Fuchigami et al. | 360/60 |
| 5,963,909 | * 10/1999 | Warren et al. | 360/60 |

FOREIGN PATENT DOCUMENTS 0360615    3/1990   (EP) .
0400906    12/1990  (EP) .

\* cited by examiner

*Primary Examiner*—W. Chris Kim
(74) *Attorney, Agent, or Firm*—Jay H. Maioli

(57) ABSTRACT

An additional information f2a previously superimposed repeatedly four times with a period shorter than the decoding period of a spread information on an information signal f1a by way of spectral spread is detected four times by way of an additional information signal detection section by way of inversion spread based on a spectrally spread PN signal f5a from a PN generation section, the coincidence detection section confirms coincidence of four detection results, and thus the superimposition of the additional information f2a is finalized, therefore the additional information f2a is detected within a short time because of a short period of the spectral spread, the additional information f2a is detected with high detection accuracy with a small spread gain by way of confirming the coincidence of four detections, and a write section can perform write inhibition properly based on detection of the additional information f2a.

18 Claims, 5 Drawing Sheets

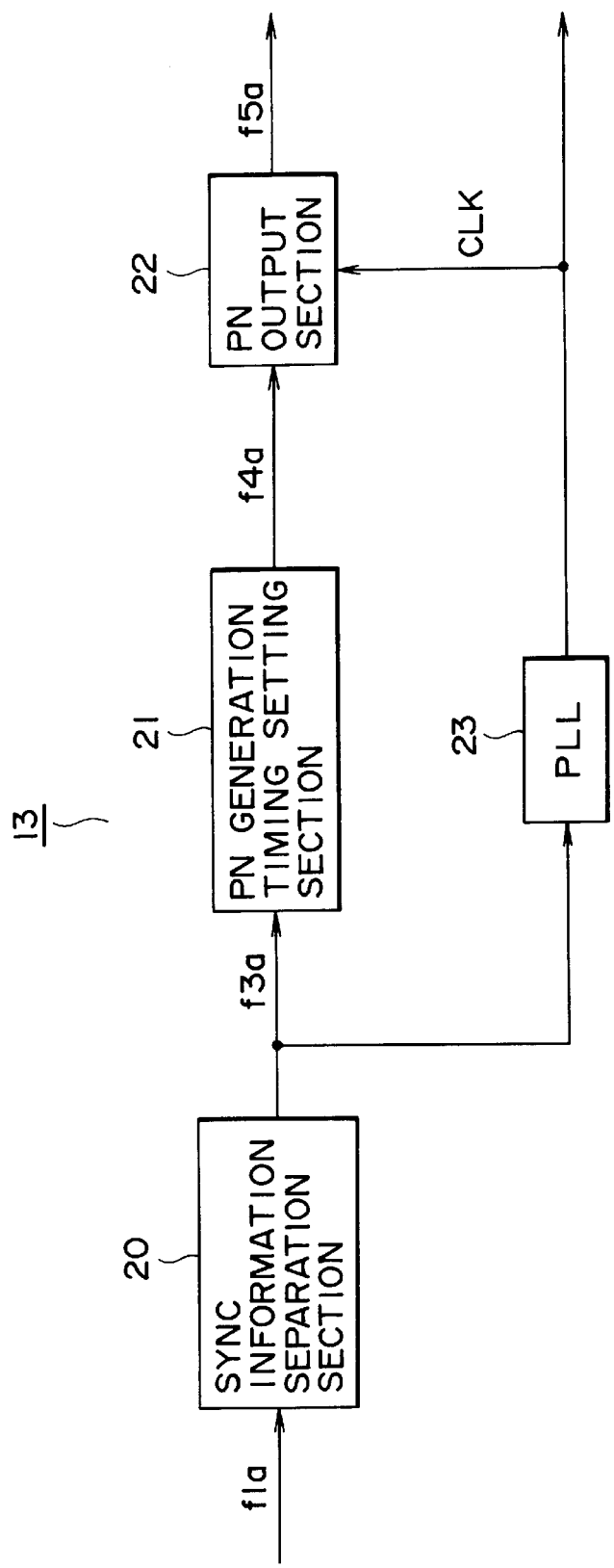
F I G. 3

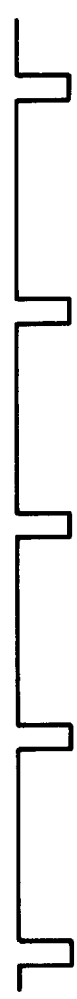
F I G. 5A  SYNC INFORMATION SIGNAL f3a
F I G. 5B  EXAMPLE OF PN GENERATION TIMING
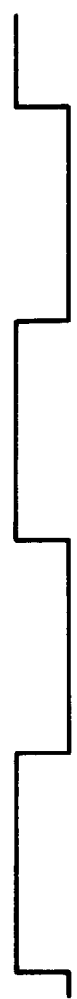
F I G. 5C  ANOTHER EXAMPLE OF PN GENERATION TIMING

METHOD FOR SUPERIMPOSING AND DETECTING ADDITIONAL INFORMATION SIGNAL, METHOD FOR DETECTING ADDITIONAL INFORMATION SIGNAL, DEVICE FOR DETECTING ADDITIONAL INFORMATION SIGNAL, AND DEVICE FOR RECORDING INFORMATION SIGNAL

BACKGROUND OF THE INVENTION

1. Field of the Invention

This invention relates to a method for identifying additional information for identifying a spectrally spread additional information superimposed on an information signal and a device for identifying a spectrally spread additional information superimposed on an information signal and for processing the information signal based on an identification result.

2. Description of Related Art

In the case that copyright of a producer is set in an information stored in a recording medium such as a magnetic tape or magnetic disk, duplication of such an information is prevented. Heretofore, processing of an information signal has been controlled in order to prevent duplication of the stored information in a recording medium by way of a method in which a spectrally spread specific additional information for specifying the producer is superimposed on the stored information signal and the additional information is identified.

For example, in such case, Japanese Patent Laid-Open No. Hei 1-149259 discloses a recording medium which is capable of detecting the producer's copyright without deterioration of the original audio signal quality by way of a method in which an additional signal for identification is spectrally spread and superimposed on the audio signal over the audio band.

In such case, a conventional information write device 1 shown in FIG. 1 which uses an additional information as an anti-duplication signal in order to prevent duplication is provided with a write section 2 for writing in a recording medium and an additional information signal detection section 3 connected to an input terminal t1 in parallel. A write control section 5 for controlling operation of the write section 2 is connected to the additional information signal detection section 3. The write control section 5 is connected to the write section 2, and a recording medium 6 in which an information signal is to be written through an output terminal t2 is connected to the write section 2.

In this conventional information write device 1, an anti-duplication signal has been added as an additional information signal on an information signal f1 supplied from the original recording medium, the information signal f1 is inputted to the write section 2 and the additional information signal detection section 3, and the additional information signal detection section 3 detects a spectrally spread additional information signal f2 superimposed on the information signal f1. Upon receiving the additional information signal f2 which the additional information signal detection section 3 detected, the write control section 5 supplies a write inhibition signal f3 to the write section 2.

The write section 2 where the information signal f1 is inputted writes the information signal f1 in the recording medium 6 if no write inhibition signal f3 is inputted from the write control section 5, and on the other hand, the write section 2 does not write the information signal f1 in the recording medium 6 and write operation is inhibited if a write inhibition signal f3 is supplied by the write control section 5.

In the above-mentioned conventional information write device 1, if an additional information f2 is superimposed on an information signal f1 from an original recording medium as described above, writing of the information signal f1 in recording media 6 is inhibited and duplication is prevented.

However, the conventional information write device 1 requires a long time to decode and detect the additional information, and is poor in detection accuracy of the additional information, and a high spread gain of spectral spread is required to ensure the detection. These conditions are disadvantageous.

The present invention is accomplished in view of the above-mentioned current problems of the additional information detection spectrally spread and superimposed on the information signal. The first purpose of the present invention is to provide a method for identifying an additional information which is capable of detecting an additional information spectrally spread and superimposed on the information signal with a small spread gain, within a short time, and with a good detection accuracy.

The second purpose of the present invention is to provide a device for identifying an additional information which is capable of detecting an additional information spectrally spread and superimposed on the information signal with a small spread gain, within a short time, and with a good detection accuracy, and performing processing of the information signal properly based on a detection result.

SUMMARY OF THE INVENTION

The method for superimposing and detecting an additional information signal, in which an information signal is generated by superimposing the additional information signal on the main information signal and the additional information signal is detected, comprises a step for superimposing repeatedly a plurality of times a spectrally spread additional information on the main information signal in order to generate the information signal, a step for performing inversion spectral spread on the information signal using the spectrally spread code in order to detect the additional information signal the plurality of times, and a step for judging the superimposition of the additional information signal on the information signal if the plurality of detection results of the additional information signal are coincident.

The device for superimposing and detecting an additional information signal, which generates an information signal by superimposing the additional information signal on the main information signal and detects the additional information signal, is provided with an information signal generation means for superimposing repeatedly a plurality of times a spectrally spread additional information on the main information signal in order to generate the information signal, a detection means for performing inversion spectral spread on the information signal using the spectrally spread code in order to detect the additional information signal the plurality of times, and a coincidence detection means for generating a coincidence signal if the plurality of detection results of the additional information signal are coincident.

The information signal recording control device for controlling the recording of an information signal in a recording medium is provided with a detection means for inversion spectrally spreading using the spectrally spread code the information signal generated by superimposing a spectrally spread additional information signal repeatedly a plurality of times on the main information signal in order to detect the additional information signal the plurality of times, a coincidence detection means for generating a coincidence signal if the plurality of detection results of the additional information signal is coincident, and a write control means for controlling the recording of the information signal in a recording medium dependently on the coincidence signal supplied from the coincidence detection means.

BRIEF DESCRIPTION OF THE DRAWINGS

FIG. 3 is a block diagram for illustrating the structure of the PN generation section shown in FIG. 2.

FIGS. 5A to 5C are diagrams for describing setting of the PN generation timing in the above-mentioned embodiment.

DETAILED DESCRIPTION OF THE PREFERRED EMBODIMENTS

A preferred embodiment in accordance with the present invention will be described in detail hereinafter with reference to FIG. 2 to FIGS. 5A to 5C.

Figure 1:
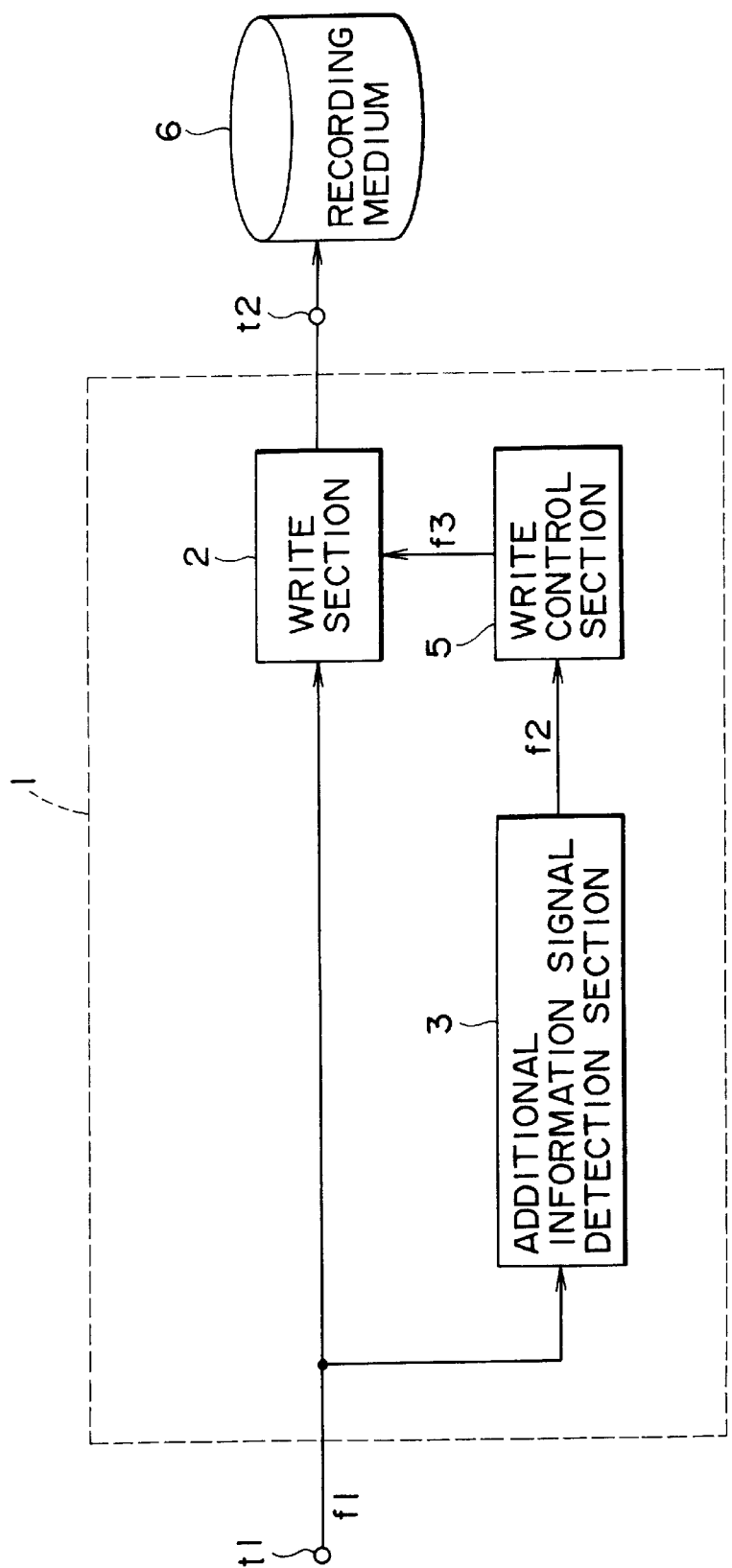
FIG. 1 is a block diagram for illustrating the structure of a conventional information write device.
Figure 2:
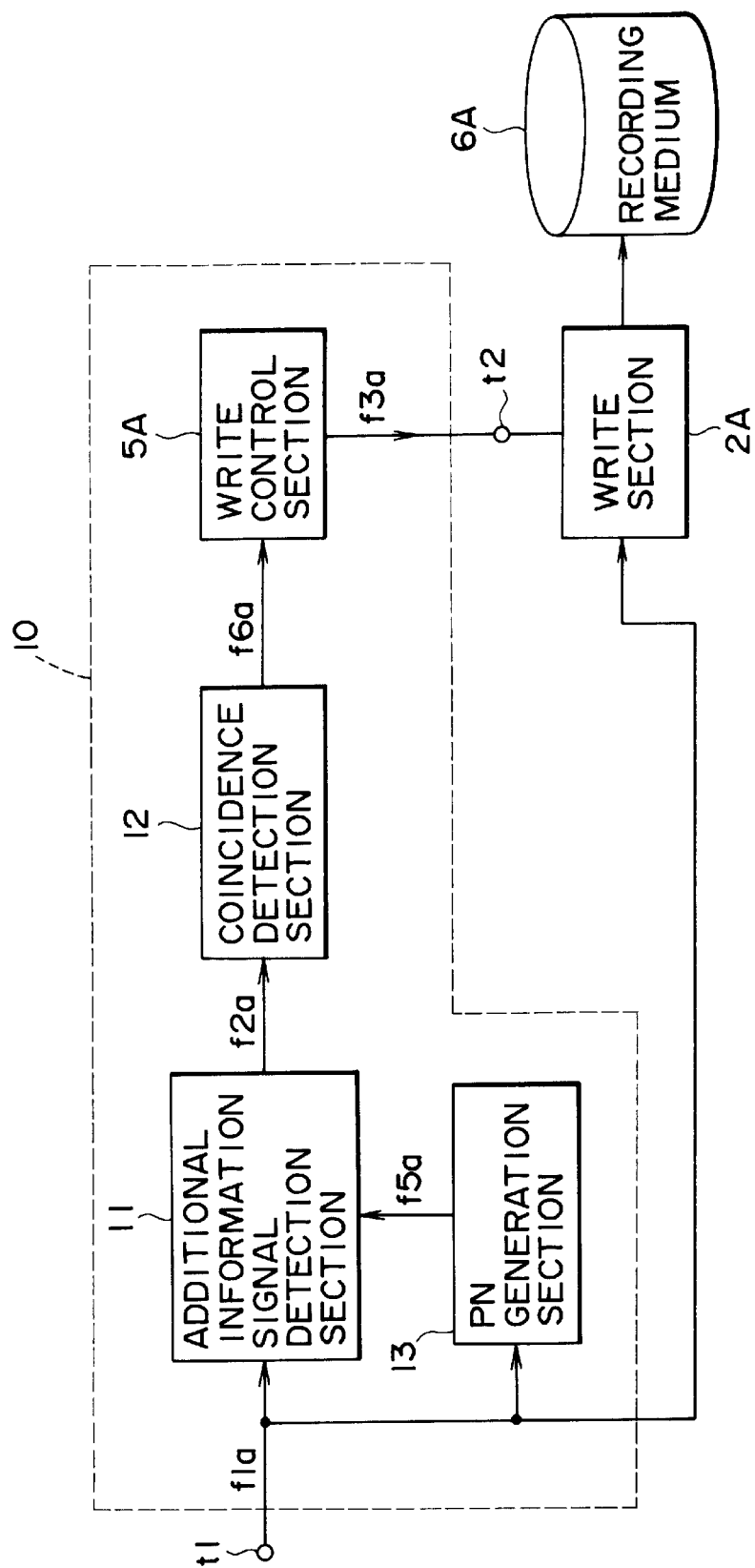
FIG. 2 is a block diagram for illustrating the structure of an embodiment in accordance with the additional information identification device of the present invention.
Figure 4:
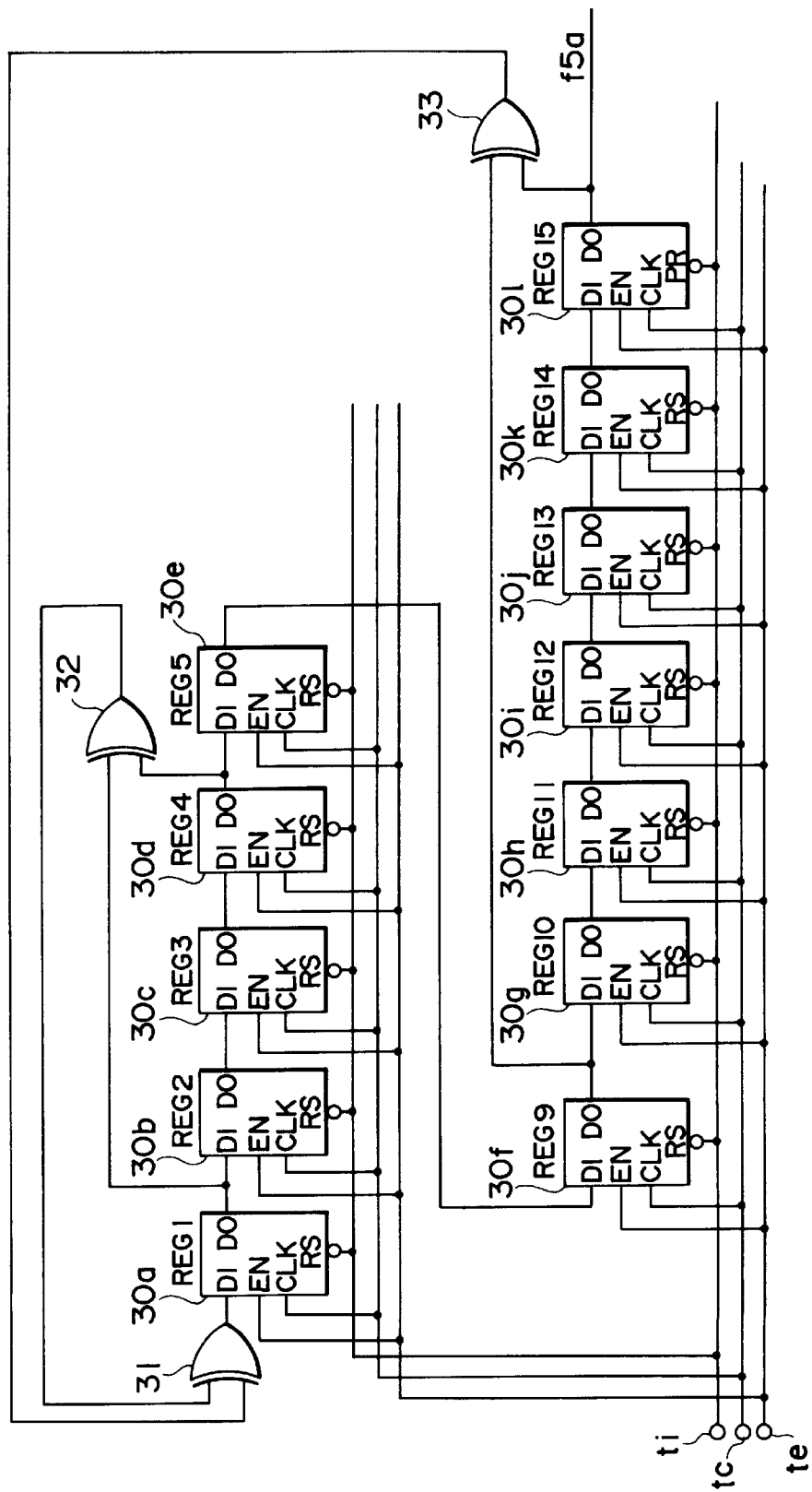
FIG. 4 a circuit diagram for illustrating the structure of the PN output section shown in FIG. 3.

FIG. 2 is a block diagram for illustrating the structure of this embodiment, FIG. 3 is a block diagram for illustrating the structure of a PN output section of FIG. 2, FIG. 4 is a circuit diagram for illustrating the structure of the PN output section shown in FIG. 3, and FIGS. 5A to 5C are diagrams for describing setting of the PN generation timing in this embodiment.

This embodiment shows a case that an additional information identification processing device in accordance with the present invention is applied to an information write device. As shown in FIG. 2, an additional information identification device 10 is provided with an input terminal t1 for receiving an information signal f1a on which an additional information has been superimposed repeatedly with a short period by way of spectral spreading. A PN generation section 13 for generating a spectrally spread PN code (pseudo noise code) and an additional information signal detection section 11 for detecting the additional information signal by inversion spectral spreading using the PN code generated from the PN generation section 13 are connected to the input terminal t1 in parallel.

The PN generation section 13 is connected to the additional information signal detection section 11, an output terminal of the additional information signal detection section 11 is connected to a coincidence detection section 12 for judging the coincidence of a plurality of times in the additional information signal detection section 11. An output terminal of the coincidence detection section 12 is connected to a write control section 5A, and an output terminal of the write control section 5A is connected to an output terminal t2.

The PN generation section 13 has the structure as shown in FIG. 3. A sync information separation section 20 for receiving the information signal f1a and extracting a sync information signal from the information signal f1a is provided. A PN generation timing setting section 21 for setting generation timing of the PN code and a PLL (phase sync circuit) 23 for generating a clock CLK based on the sync information signal are connected to an output terminal of the sync information separation section 20 in parallel. An output terminal of the PN generation timing setting section 21 and an output terminal of the PLL 23 are connected to a PN output section 22, and an output terminal of the PN output section 22 is connected to the above-mentioned additional information signal detection section 11.

The PN output section 22 has the structure as shown in FIG. 4. Registers 30a to 30l are connected in series to each other, and RS terminals, CLK terminals, and EN terminals of the registers 30a to 30l are connected respectively to an initialization terminal ti for receiving an initialization signal, a clock terminal tc for receiving a clock, and an enable terminal te for receiving an enable signal. DO terminals of the registers 30a and 30d are connected to respective input terminals of an exclusive OR circuit 32, an output terminal of the exclusive OR circuit 32 is connected to one input terminal of an exclusive OR circuit 31, and an output terminal of the exclusive OR circuit 31 is connected to a DI terminal of the register 30a.

Further, DO terminals of the registers 30f and 30l are connected to respective input terminals of an exclusive OR circuit 33, and an output terminal of the exclusive OR circuit 33 is connected to the other input terminal of the exclusive OR circuit 31.

In this embodiment, as shown in FIG. 2, the write section 2A is connected to the output terminal t2 of the additional information identification processing device 10. The input terminal t1 of the additional information identification processing device 10 is connected to the input terminal of the write section 2A, and the recording medium 6A is connected to the output terminal of the write section 2A.

The operation of the embodiment having the above-mentioned structure is described hereinafter.

In this embodiment, the additional information signal f2a is superimposed previously repeatedly a plurality of times (in this embodiment, four times) with a period shorter than the decoding period of the spread information by way of spectral spread on the information signal f1a played back and outputted from the original recording medium. The information signal f1a is inputted to the input terminal t1 of the additional information identification processing device 10, and inputted to the additional information signal detection section 11 and PN generation section 13 respectively.

In the PN generation section 13, the information signal f1a is inputted to the sync information separation section 20 shown in FIG. 3, the sync information f3a is extracted from the information signal f1a, the extracted sync information signal f3a is inputted to the PN generation timing setting section 21 and PLL 23, respectively.

In the PN generation timing setting section 21, a generation timing signal f4a of a spectrally spread PN code is set and outputted as shown in FIGS. 5B and 5C based on an input sync information signal f3a as shown in FIG. 5A, and inputted to the PN output section 22. In the PLL 23, the clock CLK is generated based on the input sync information signal f3a, and the clock CLK is inputted to the PN output section 22 and also outputted to the outside.

In the PN output section 22, as shown in FIG. 4, the PN generation timing signal f4a is inputted to the initialization terminal ti, the clock CLK outputted from the PLL 23 is inputted to the clock terminal tc. The enable signal is supplied to the enable terminal te, and the longest pseudo random code generated by the twelve step registers 30a to 30l, which the exclusive OR circuits 32 and 33 feed back, is outputted from the final step register 30l as the PN signal f5a.

The PN signal f5a is inputted to the additional information signal detection section 11 of the additional information identification processing device 10 shown in FIG. 2, and in the additional information signal detection section 11, the input information signal f1a is subjected to inversion spread based on the PN signal f5a inputted from the PN generation section 13, the spectrally spread additional information signal f2a superimposed on the information signal f1a is detected and outputted from the additional information signal detection section 11, and supplied to the coincidence detection section 12.

As described herein above, all the additional information signals f2a superimposed repeatedly four times with a period shorter than decoding period of the spread information are detected by means of additional information signal detection section 11 by way of spectrally spreading on the information signal f2a, and the coincidence detection section 12 judges whether four detection results are coincident. If four detection results are coincident, then a coincident signal f6a is supplied from the coincidence detection section 12 to the write control section 5A, and a write inhibition signal f3a is supplied from the write control section 5A to the write section 2A. Based on the write inhibition signal f3a, the write section 2A does not write the information signal f1a in the recording medium, and writing of the information signal is inhibited.

As described hereinbefore, according to the present invention, only when the additional information f2a which is generated by previously superimposing repeatedly four times with a period shorter than the decoding period of the spectrally spread information on the information signal f1a is detected four times by way of inversion spread by means of the additional information signal detection section 11 with reference to the spectrally spread PN signal f5a supplied from the PN generation section 13 and the coincidence detection section 12 confirms coincidence of four detection results, the superimposition of the additional information f2a is finalized. The detection of the additional information f2a is carried out in a short time because the period of spectral spread is short, the confirmation of coincidence of four detection results leads to enhanced detection accuracy of the additional information f2a, the detection of the additional information f2a is ensured with a small spread gain, and write inhibition in the write section 2A is performed properly.

According to the first feature of the present invention, in the additional information identification method for identifying an additional information from an information signal on which the additional information for identification is superimposed repeatedly with a short period by way of spectral spread, a spectrally spread PN code is generated, the additional information is detected a plurality of times by way of inversion spectral spread using the PN code, the superimposition of the additional information on the information signal is identified based on the coincidence of a plurality of detection results, thereby the detection time is shortened because of short period of spectral spread, and the additional information can be detected with a small spread gain and high accuracy by confirming the coincidence of a plurality of detection results.

According to the second feature of the present invention, when the additional information for identification is identified from the information signal on which the additional information for identification is superimposed repeatedly with a short period by means of spectra spreading, the PN generation means generates a spectrally spread PN code, the detection means detects the additional information by way of spectral spread using the generated PN code, the superimposition of the additional information is identified by the identification means based on the coincidence of a plurality of detection results of the additional information, the control means controls processing of the information signal based on the identification result, and thereby the detection time is shortened because of the short period of the spectral spread, and the additional information can be detected with a small spread gain and high accuracy by confirming the coincidence of a plurality of detection results, it is possible to process the information signal properly based on the high accuracy detection result of the additional information.

According to the third feature of the present invention, in addition to the effect obtained by the second feature of the present invention, because the control means controls writing of the information signal in the recording medium based on the detection result of the additional information, it is possible to prevent duplication of the information signal properly.

What is claimed is:

1. A method for superimposing and detecting additional information in which an information signal is generated by superimposing said additional information on main information, said method for superimposing and detecting said additional information comprising the steps of:
   superimposing repeatedly a plurality of times said additional information on said main information in order to generate said information signal;
   detecting said additional information a plurality of detections; and
   determining that said additional information is superimposed on said main information when said plurality of detections of said additional information are coincident.

2. The method for superimposing and detecting said additional information as claimed in claim 1, further comprising the step of controlling writing of said information signal in a recording medium.

3. The method for superimposing and detecting additional information as claimed in claim 1, wherein
   said superimposing step of superimposing said additional information on said main information signal information includes spectrum spreading said additional information using a spread spectrum code; and
   said step of detecting includes detecting said additional information by processing said information signal using an inverse spread spectrum generated from said spread spectrum code.

4. The method for superimposing and detecting said additional information as claimed in claim 1, further comprising the step of controlling an output of said information signal based on a result of said step of determining.

5. A device for superimposing and detecting additional information which generates an information signal by superimposing said additional information on main information and detects said additional information, said device for superimposing and detecting said additional information comprising:
   information signal generation means for superimposing repeatedly a plurality of times said additional information on said main information in order to generate said information signal;
   detection means for detecting said additional information a plurality of detections; and
   determination means for determining that said additional information is superimposed on said main information when said plurality of detections of said additional information are coincident.

6. The device for superimposing and detecting additional information as claimed in claim 5, wherein said information signal generation means superimposes said additional information on said main information signal by spreading said additional information using a spread spectrum code; and said detecting means detects said additional information by processing said information signal using an inverse spread spectrum generated from said spread spectrum code.

7. The device for superimposing and detecting said additional information as claimed in claim 5, further comprising means for controlling writing of said information signal in a recording medium based on a result of said determination means.

8. The device for superimposing and detecting said additional information as claimed in claim 5, further comprising means for controlling an output of said information signal based on a result of said determination means.

9. An additional information detection device comprising:

a detector for receiving an information signal; and a coincidence section coupled with said detector, wherein said detector detects an additional information signal superimposed on said information signal a plurality of times and said coincidence section outputs a signal indicating whether said plurality of times of detection of the additional information signal are coincident.

10. An additional information signal detection method in which an additional information signal is detected from an information signal generated by superimposing repeatedly a plurality of times said additional information signal on a main information signal, said additional information signal detection method comprising the steps of:

detecting said additional information signal with a plurality of detections; and determining that said additional information signal is superimposed on said main information signal if said plurality of said detections of said additional information signal are coincident.

11. The additional information signal detection method as claimed in claim 10, further comprising the step of controlling writing of said information signal in a recording medium based on a result of said step of determining.

12. The additional information signal detection method as claimed in claim 10, further comprising the step of processing an inverse spread spectrum of the information signal using the spread spectrum code in order to detect said additional information at said step of detecting.

13. The additional information signal detection method as claimed in claim 10, further comprising the step of controlling an output of said information signal based on a result of said of determining.

14. An additional information signal detection device, which detects an additional information from an information signal generated by superimposing repeatedly a plurality of times additional information on a main information signal, said additional information detection device comprising:

detection means for detecting said additional information with a plurality of detections; and determination means for determining that said additional information is superimposed on said main information signal when said plurality of detections are coincident.

15. The additional information signal detection device as claimed in claim 14, further comprising means for controlling writing of said information signal in a recording medium based on a result of said determination means.

16. The additional information signal detection device as claimed in claim 14, further comprising means for controlling an output of said information signal based on a result of said determination means.

17. The additional information signal detection device as claimed in claim 14, further comprising means for processing an inverse spread spectrum of said information signal using a spread spectrum code in order to detect said additional information at said detection means.

18. An information signal recording control device comprising:

a detection section for receiving and processing an information signal; and a write control section coupled with said detection section, wherein said detection section detects an additional information signal superimposed on said information signal a plurality of times and outputs a signal indicating whether a plurality of detection results of the additional information signal are coincident, and whereby said write control section controls writing of said information signal in a recording medium according to said signal output from said detection section.

* * * * *